United States Patent [19]
DuBois et al.

[11] Patent Number: 5,682,225
[45] Date of Patent: Oct. 28, 1997

[54] LADAR INTENSITY IMAGE CORRECTION FOR LASER OUTPUT VARIATIONS

[75] Inventors: David S. DuBois; Bruno J. Evans; Gary K. Jenkins, all of Arlington, Tex.

[73] Assignee: Loral Vought Systems Corp., Grand Prairie, Tex.

[21] Appl. No.: 664,231

[22] Filed: Jun. 7, 1996

[51] Int. Cl.$^6$ ........................................ G01N 21/00
[52] U.S. Cl. ...................... 356/73; 356/5; 342/61; 342/53
[58] Field of Search ................ 356/73, 5; 342/61, 342/53

[56] References Cited

U.S. PATENT DOCUMENTS 3,897,150  7/1975  Bridges et al. ........................ 356/5
4,914,734  4/1990  Love et al. ........................... 342/64

*Primary Examiner*—Frank Gonzalez
*Assistant Examiner*—Reginald A. Ratliff
*Attorney, Agent, or Firm*—Arnold, White & Durkee

[57] ABSTRACT

A method and apparatus for generating sharper and more accurate LADAR intensity images is disclosed. The LADAR system includes an optical transmitter and receiver that generates and scans a laser beam in a target field. A backscatter detector senses the magnitude of the generated laser beam. A signal processing unit uses the magnitude of the transmitted laser beam to adjust the magnitude of received reflections to produce a sharper intensity image.

12 Claims, 12 Drawing Sheets

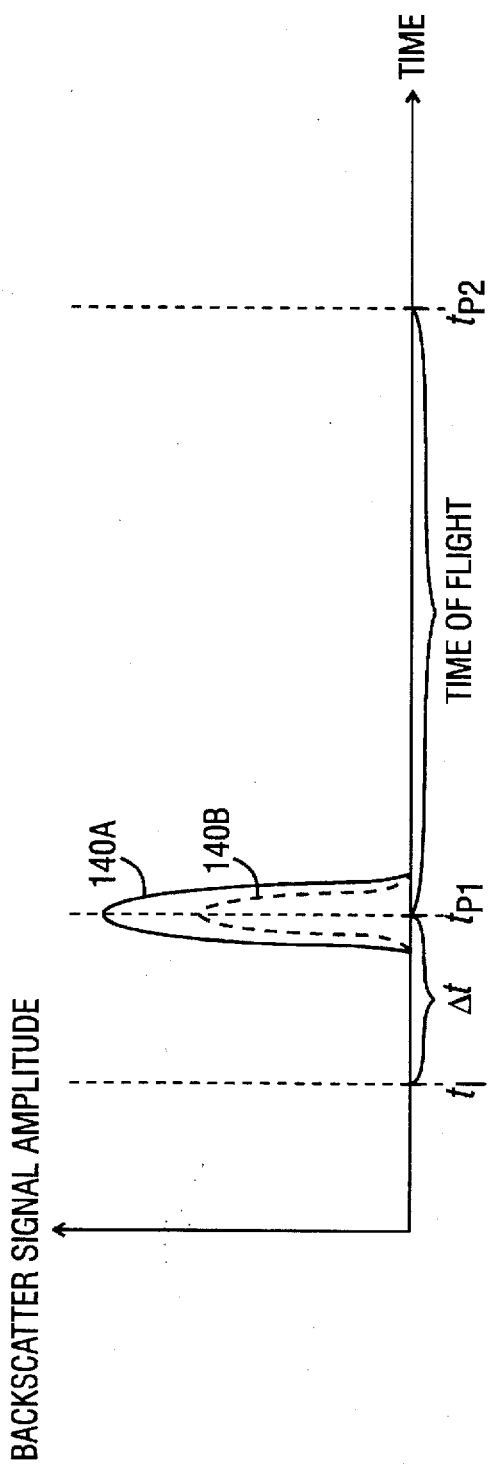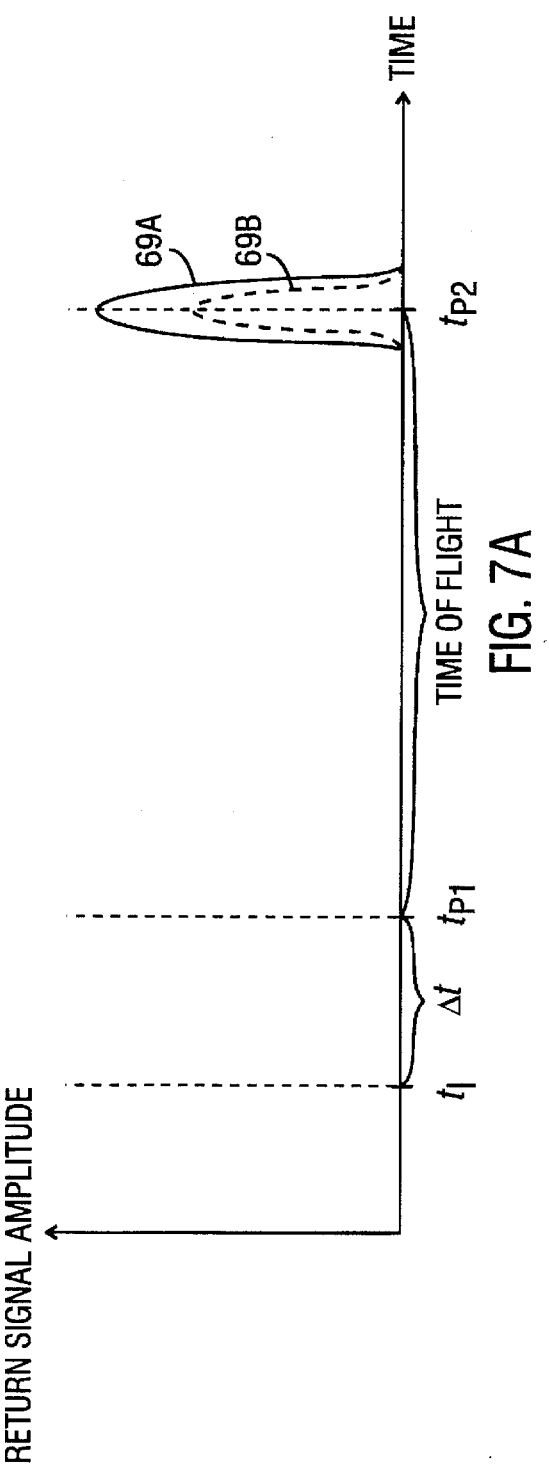

LADAR INTENSITY IMAGE CORRECTION FOR LASER OUTPUT VARIATIONS

BACKGROUND OF THE INVENTION

1. Field of the Invention

This invention relates generally to laser detection and ranging (LADAR) systems and, more particularly, to methods and apparatus for improving LADAR imaging.

2. Description of the Related Art

Methods and apparatus for identifying targets, whether such targets have been stationary or moving, have existed for many years. For instance, in World War II, the British developed and utilized radar, for identifying the incoming planes of the German Luftwaffe. Radar uses radio waves (instead of the light waves that human eye uses to see) to locate objects at great distances even in bad weather or in total darkness. Currently, radar is employed in a wide variety of areas, including air traffic control, early warning systems for national defense, law enforcement of speed limits on highways, and weather forecasting, along with the more traditional use of radars for target identification. While ground-based and airborne radar are used to identify enemy ships and aircraft, radar is also used to aim and fire guns and missiles. In addition, radar has also been used to map terrain.

While radar has proven quite effective in many areas, radar is inherently limited because of its use of radio frequency signals and the size of the resultant antennas used to transmit and receive such signals. In an effort to overcome some of these limitations, lasers have been employed in detection and ranging systems. Like radar, which takes its name from the phrase "radio detection and ranging," laser detection and ranging systems are referred to as LADAR systems. Like radar systems, which transmit radio waves and receive waves reflected from objects, often called targets, LADAR systems transmit laser beams and receive reflections from targets. Because of the short wavelengths associated with laser beam transmissions, LADAR imaging exhibits much greater resolution than radar imaging. In other words, LADAR is capable of more accurately pinpointing a target than radar.

The LADAR systems designed by the assignee of the present invention form two different types of images. However, before describing these images, it should be understood how these images are formed. A scan pattern is generated by scanning a pulsed laser beam in a pattern throughout a particular field. The generation of this scan pattern is somewhat similar to the manner in which an electron gun in a television set is rastered many times a second over the entire screen to generate a television image. In fact, LADAR images are frames of pixels having x rows and y columns to form a pixel array. While such an array may be any of a variety of sizes, a common array size is 256 pixels per row and 256 pixels per column.

One of the images generated in this manner is referred to as the "range" image. The range image is generated by determining the time between the departure of a laser pulse and the corresponding return laser pulse that has been reflected from an object in the pattern field. For display purposes, each range image is divided into range bands. A repeating color spectrum is assigned to each range band in the range image so that relative distances of objects in the range image can be perceived. For example, objects in a particular range image may be from 1,000 to 2,000 meters away from the LADAR, and the color bands may each be 100 meters. In this example, the range image would show ten repeating color bands. Each color band might use, for instance, five different colors to illustrate the relative range of an object within the color band. Blue might be used to represent the range of each object in the first 20 meters of a color band, with the colors green, yellow, red, and purple used to represent the range of objects in successive 20 meter bands of each color band.

The other type of image generated by a LADAR system is referred to as an "intensity" image. The intensity image is generated by determining the magnitude of each reflected laser pulse received by the LADAR system. Highly reflective objects in the field, such as light colored objects, appear lighter in the intensity image because the laser pulse reflected from these materials will have a relatively high magnitude. Poorly reflective materials, such as dark colored objects, appear darker in the intensity image because these materials absorb much of the transmitted laser pulse and, thus, the reflected pulse received by the LADAR system is relatively weak.

While the range and intensity images are useful for a variety of purposes, the intensity image has at least two unique uses. First, it provides an image that is typically easier for a person to interpret than the range image, because the intensity image looks very much like a black and white picture. The range and intensity images are typically viewed together, so that a person can identify features in the intensity image and then look to the range image to gain some understanding of the three dimensional aspects of the identified features. Second, the intensity image can be processed using automatic target recognition systems that use edge detection to identify and locate fixed, high value targets, such as buildings. For instance, a LADAR system can be mounted into the nose of a missile, and the data provided by the LADAR system can be used to guide the missile to the target. If the mission target is a fixed, high value target, an automatic target recognition system might be used to detect the target by detecting edges of the target appearing in the intensity image provided by the LADAR system.

While present LADAR systems generate adequate intensity images, sharper intensity images would facilitate and improve the operation of edge detection-based automatic target recognition systems because it would be easier for such systems to locate targets if the edges of such targets were better defined by a sharper intensity image. Of course, sharper intensity images would also enhance the use of LADAR systems in other areas, such as terrain mapping.

The present invention is primarily directed to overcoming or reducing the effects of one or more of the problems mentioned above. However, the present invention may overcome other problems not mentioned herein.

SUMMARY OF THE INVENTION

In accordance with one aspect of the present invention, there is provided a method of generating target information. The method includes the steps of:

(a) generating successive laser pulses, each of the successive laser pulses having a respective magnitude;

(b) scanning each of the successive laser pulses in a target field;

(c) receiving reflections from the successive laser pulses;

(d) determining the respective magnitude of each of the successive laser pulses;

(e) generating a correction factor correlative to varying magnitudes of the successive laser pulses;

(f) applying the correction factor to the received reflections to generate corrected reflection signals; and (g) generating an intensity image using the corrected reflection signals.

In accordance with another aspect of the present invention, there is provided an apparatus for generating target information. The apparatus includes (1) means for generating successive laser pulses; (2) means for scanning each of the successive laser pulses in a target field; (3) means for receiving reflections from the successive laser pulses; (4) means for determining the respective magnitude of each of the successive laser pulses; (5) means for generating a correction factor correlative to varying magnitudes of the successive laser pulses; (6) means for applying the correction factor to the received reflections to generated corrected reflection signals; and (7) means for generating an intensity image using the corrected reflection signals.

In accordance with yet another aspect of the present invention, there is provided an apparatus for generating target information. The apparatus includes a transmitter that is adapted to deliver a laser pulse having a magnitude into a target field. A receiver is adapted to receive a reflection of the laser pulse from an object in the target field and to deliver a reflection signal correlative to the received reflection. A detector is arranged to receive light from the laser pulse. The detector delivers a detector signal having a magnitude correlative to the magnitude of the laser pulse. A processor is coupled to the receiver to receive the reflection signal and the detector signal. The processor processes the detector signal and the reflection signal to generate a corrected intensity signal correlative to reflectivity of the object.

BRIEF DESCRIPTION OF THE DRAWINGS

The foregoing and other advantages of the invention will become apparent upon reading the following detailed description and upon reference to the drawings in which:

FIG. 7 illustrates exemplary representations of transmitted laser pulses and exemplary return laser pulses;

Figure 1:
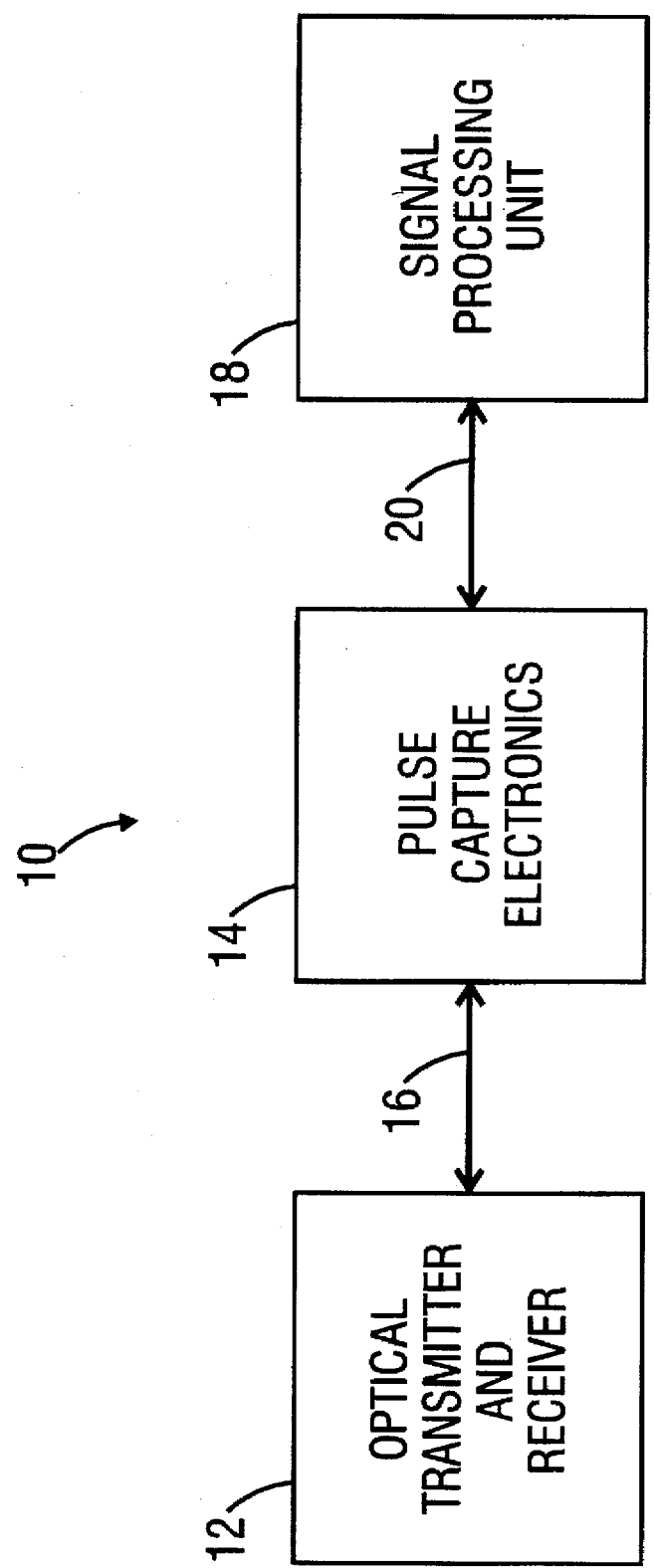
FIG. 1 illustrates a block diagram of a LADAR system in accordance with the present invention.

While the invention is susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents and alternatives falling within the spirit and scope of the invention as defined by the appended claims.

DESCRIPTION OF SPECIFIC EMBODIMENTS

Turning now to the drawings and referring initially to FIG. 1, there is illustrated a block diagram of a LADAR system generally designated by the reference numeral 10. The LADAR system 10 includes an optical transmitter and receiver 12. As will be discussed more fully below, the optical transmitter and receiver 12 generates a laser beam and scans the laser beam in a predetermined field pattern. Objects in the scanned field reflect the scanned laser beam, and the optical transmitter and receiver 12 receives some of these reflections.

The optical transmitter and receiver 12 delivers signals indicative of these received reflections to pulse capture electronics (PCE) 14 via line 16. The PCE 14 essentially converts the received laser light reflections into correlative electronic signals. It then digitizes the electronic signals and creates signals indicative of range and signals indicative of intensity.

The PCE 14 delivers these range and intensity signals to a signal processing unit 18 via line 20. The signal processing unit 18 creates a range image and an intensity image using a plurality of these signals which represent the returned reflections of the laser beam being scanned over a particular field.

Figure 2:
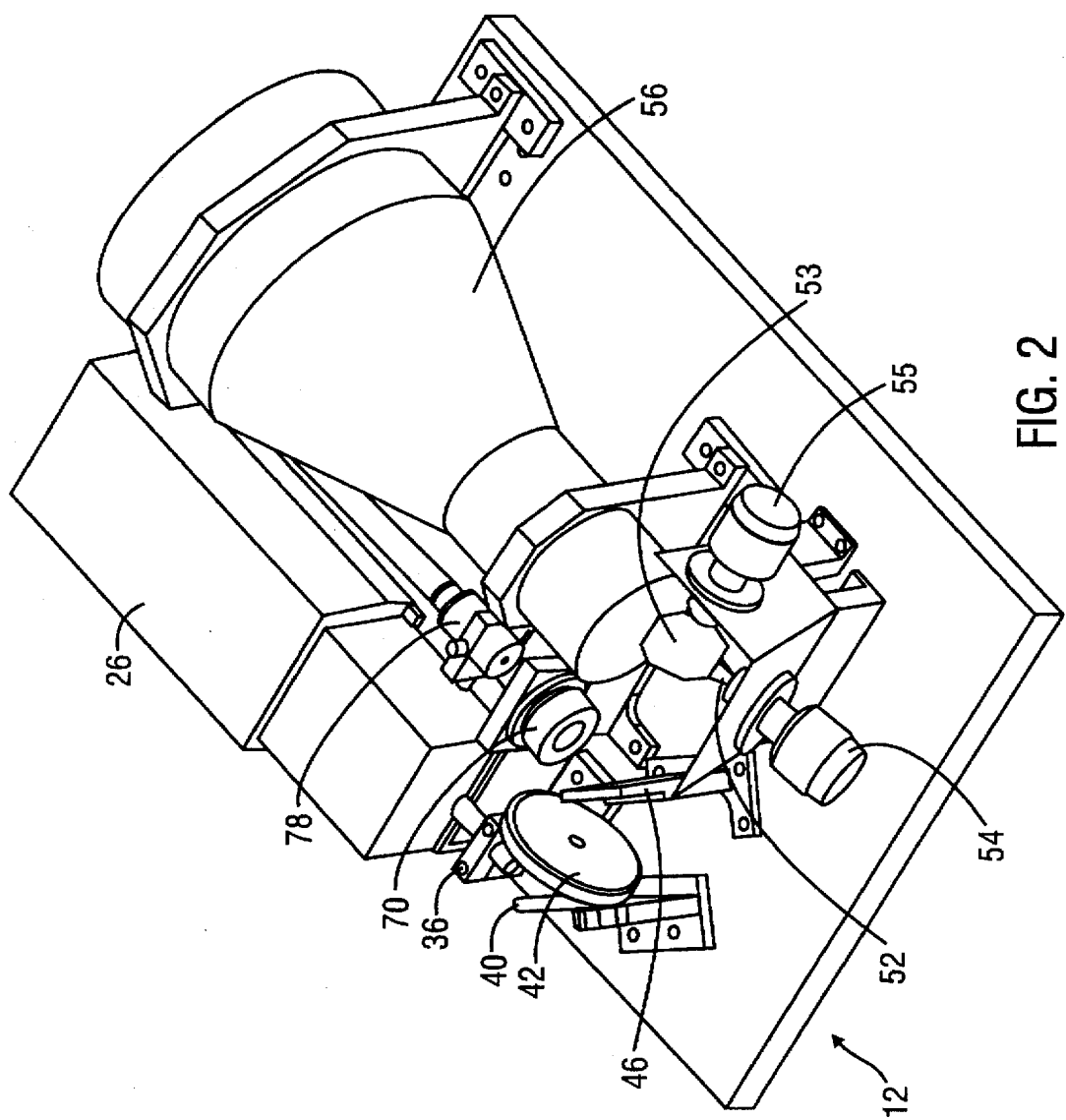
FIG. 2 illustrates a perspective view of an exemplary optical transmitter and receiver for use with a LADAR system.

Although a variety of LADAR systems may enjoy the benefits described and claimed herein, a specific LADAR system will be described for purposes of providing an example of a specific embodiment. One example of an optical transmitter and receiver 12 is illustrated in, and will be described in reference to, FIGS. 2 and 3. Depending upon its intended use, the optical transmitter and receiver 12 may be portable, mounted on a gimbal mechanism (not shown), or fixedly mounted. Basically, the optical transmitter and receiver 12 includes a laser unit 26, which emits laser beam pulses used for illuminating a target, and an optical system generally designated by the reference numeral 28, which transmits the laser beam pulses to the target and receives reflections from the target in the form of return pulses.

The laser unit 26 includes a laser 30. In this embodiment, the laser 30 has an average power output in the range of 1 to 10 watts and produces a laser beam pulse having a wavelength in the near infrared range of about 1.047 to 1.064 microns. The laser 30 may be, for instance, a neodymium-doped yttrium aluminum garnet, a neodymium-doped yttrium lithium fluoride, or a YVO4 laser capable of producing pulses with widths of 5 to 20 nanoseconds, energy per pulse in the range of 100 to 1000 microjoules, and repetition rates of 6 to 20 kHz.

Advantageously, the light emitted by the LADAR system 10 is "eye safe." In other words, viewing such laser light does not damage the human eye. Wavelengths between 0.4 and 1.4 microns, and particularly those wavelengths above 0.7 microns that cannot be seen by the human eye, can cause such damage because these wavelengths can be focused and thereby concentrated by the lens of the eye onto the retina. The threshold at which eye damage may occur is much higher for wavelengths above 1.4 microns than for wavelengths below 1.4 microns.

To alter the wavelength of light emitted from the laser unit 26, the laser unit 26 includes an optical parametric oscillator (OPO) 32. The laser 30 pumps the OPO 32, and, thus, the output power of the laser 30 should be sufficient to actuate the OPO 32. The OPO 32 converts the pulse from the laser 30 into a laser beam pulse of a different wavelength. This wavelength is advantageously above 1.4 microns, such as 1.54 microns.

The laser unit 26 generates a laser beam pulse 34, as described above, and transmits the laser beam pulse 34 into a beam expander 36. The beam expander 36 uses a series of positive and negative lenses to expand the diameter of the laser beam pulse 34 to provide an expanded beam, suitably by an 10 to 1 ratio while decreasing the divergence of the laser beam pulse 34 by the same ratio.

The laser beam pulse 34, now expanded, passes through a shutter 38 that opens before each scan and closes after each scan. By using the shutter 38, the laser 30 may remain on between scans, as the shutter 38 controls the distribution of the laser beam to the remainder of the optical transmitter and receiver 12.

Figure 3:
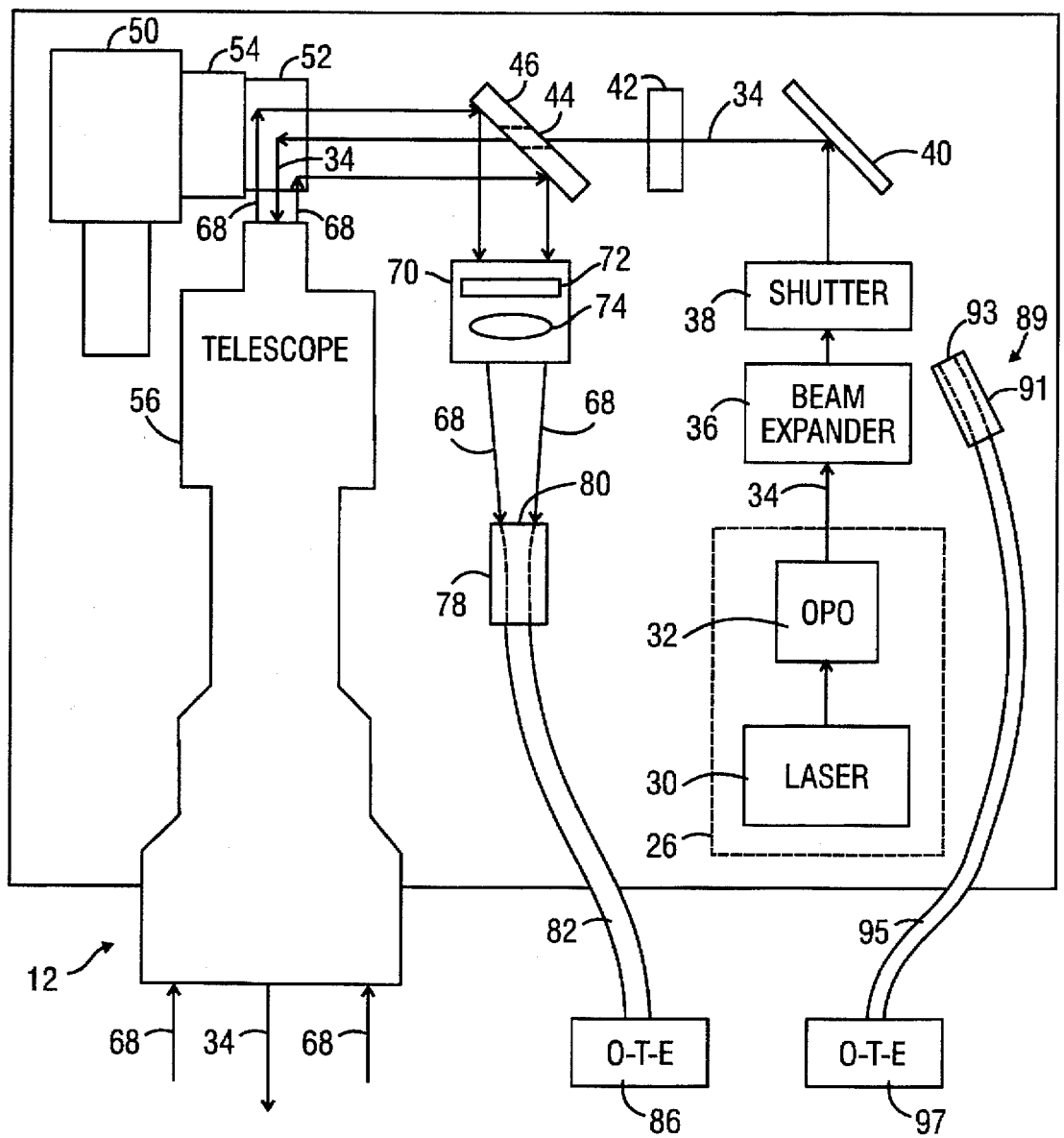
FIG. 3 illustrates a diagrammatic top view of the optical transmitter and receiver illustrated in FIG. 2.

After the laser beam pulse 34 passes through the open shutter 38, a folding mirror 40 reflects the laser beam pulse 34 through a filter 42. The filter 42 attenuates wavelengths other than the desired wavelength, e.g., 1.54 microns, produced by the laser unit 26. The laser beam pulse 34 next passes through a central aperture 44 in an apertured mirror 46 and is delivered to a scanning assembly 50. The scanning assembly 50 advantageously includes a scanning mirror 52 driven by a motor 54 and a scanning mirror 53 driven by a motor 55. (Only the scanning mirror 52 and the motor 54 are illustrated in FIG. 3 for purposes of clarity.) The scanning assembly 50 scans the laser beam pulse 34 in a given pattern to produce the desired image. The scanning mirror 53 directs the laser beam pulse 34 into a telescope 56. The telescope in this embodiment is a Galilean telescope, although other types of telescopes may be used.

When the transmitted laser beam pulse 34 delivered by the telescope 56 hits its target, the target reflects the laser beam pulse 34. Some of this reflected radiation bounces back toward the telescope 56 where it is received in the form of a return pulse generally designated by the reference numeral 68. The return pulse 68 impinges upon the scanning mirror 53 which, in combination with the scanning mirror 52, directs the return pulse 68 toward the apertured mirror 46. Because the return pulse 68 is of substantially larger cross-sectional area than the transmitted laser beam pulse 34, it strikes substantially the entire reflecting surface of the apertured mirror 46, and substantially all of its energy is thus reflected laterally by the apertured mirror 46 toward collection optics, generally designated by the reference numeral 70.

The collection optics 70 include a narrow band filter 72 that filters out wavelengths of light above and below a desired laser wavelength to reduce background interference from ambient light received by the collection optics 70 through the telescope 56. The return pulse 68 then passes through a condensing lens 74 that focuses the return pulse 68 toward a receiver 78. The receiver 78 holds the receiving end 80 of a light collection fiber optic 82 at the location where the return pulse 68 is focused.

The end of the fiber optic 82 opposite the receiving end 80 is connected to an optical-to-electrical converter 86. The optical-to-electrical converter 86 is advantageously a photodiode, such as an avalanche photodiode, which converts the reflected radiation 68 into an electrical signal 69 that the PCE 14 can process.

Positioned near the beam expander 36 is a backscatter detector, which is generally designated by the reference numeral 89. The backscatter detector 89 includes a receiver 91 that mounts the end 93 of a fiber optic 95 near the beam expander 36. The other end of the fiber optic 95 is coupled to an optical-to-electrical converter 97. Such optical-to-electrical converter 97 may be a photodiode, such as an avalanche photodiode.

The end 93 of the fiber optic 95 of the backscatter detector 89 receives scattered light, illustrated as a backscatter pulse 101, that is generated by the transmitted laser beam pulse 34 reflecting off of the optics in the optical transmitter and receiver 12. Thus, it should be understood that the backscatter detector 89 may be placed in any location where it can receive sufficient backscattered radiation. The fiber optic 95 delivers this light to the optical-to-electrical converter 97 that converts the light energy to a corresponding electrical backscatter signal.

This backscatter signal from the optical-to-electrical converter 97 is used for two purposes. First, the signal provides a timing reference that indicates when the laser beam pulse 34 was transmitted. As will be explained in greater detail below, the signal processing unit 18 uses this transmit timing reference to measure the time-of-flight of each return pulse 68 which is then used to generate the range image. Second, the signal has a magnitude that is correlative to the magnitude of the transmitted laser beam pulse 34. As will be explained in greater detail below, the signal processing unit 18 uses this magnitude signal to measure the time-varying magnitude of transmitted laser beam pulses 34. This measurement is used to adjust the magnitude of return pulses 68. These adjusted return pulses 68 are used to form the intensity image. This correction provides a sharper intensity image than do conventional methods.

Figure 4:
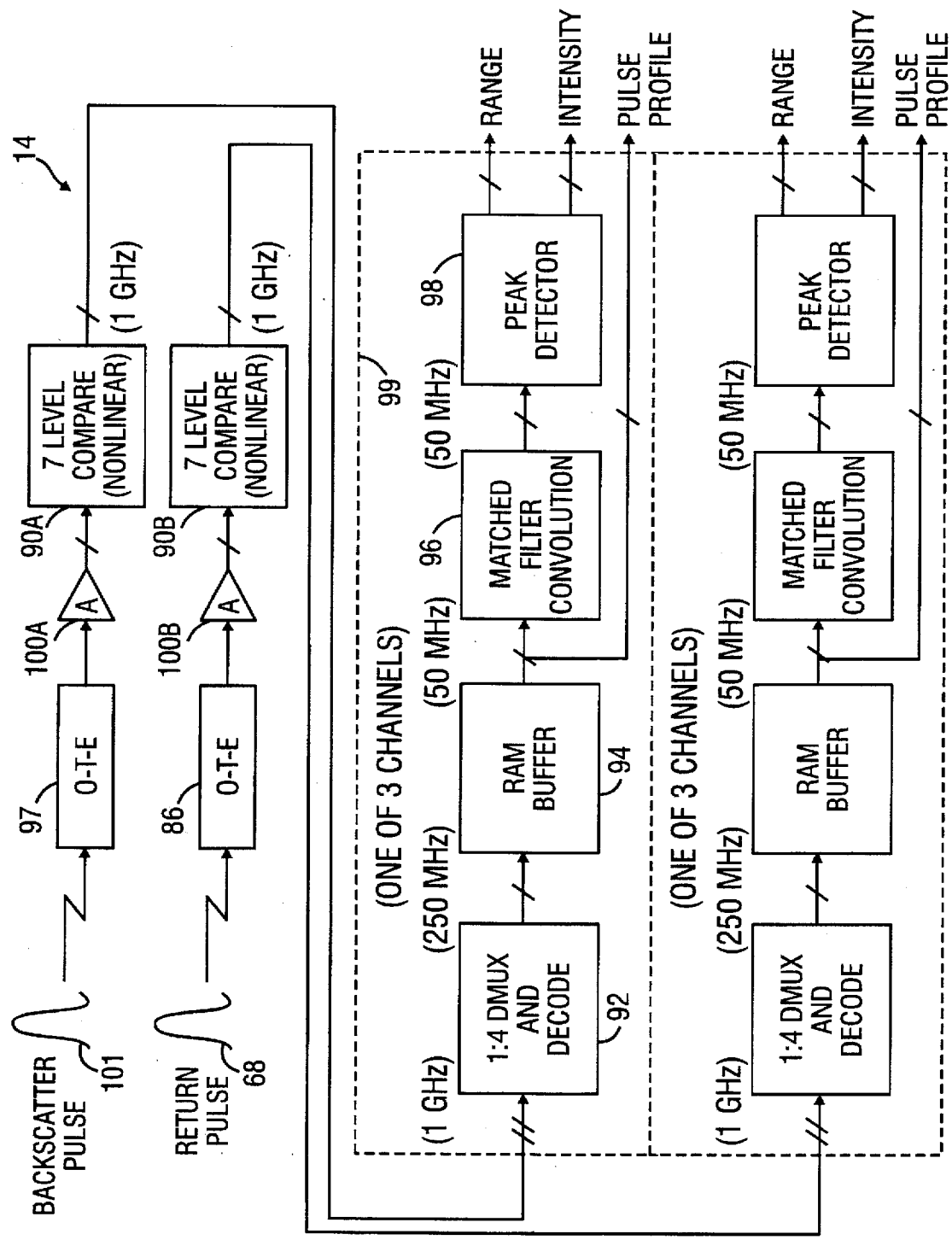
FIG. 4 illustrates a block diagram of exemplary pulse capture electronics for use with a LADAR system.

The optical-to-electrical converters 86 and 97 are actually part of the PCE 14 that is illustrated in detail in FIG. 4. The PCE 14 initiates the firing of the laser 26 and determines the time-of-flight, i.e., range, and intensity of the return pulses 68 received by the optical system 28. Each optical-to-electrical converter 86 and 97 is part of a separate channel used for processing that particular signal. Thus, in the example presented above, the PCE 14 has at least two channels that receive information from the optical transmitter and receiver 12. The PCE 14 includes five primary signal processing stages: (1) an analog-to-digital comparator circuit 90, (2) an encode and time-multiplex circuit 92, (3) a random access memory (RAM) buffer 94, (4) a matched-filter convolution circuit 96, and (5) a peak detector 98. In the disclosed embodiment, these stages are embodied as a three-channeled, monolithic, digital integrated circuit, commonly called an application specific integrated circuit (ASIC) 99, with an external analog comparator front end.

Each optical-to-electrical converter 86 and 97 feeds its electrically converted pulse to a separate comparator circuit 90a and 90b through a respective amplifier 100a and 100b. In this embodiment, the comparator circuits 90a and 90b are nonlinear. Specifically, the comparator circuits 90a and 90b each include seven individual comparators that have thresholds that logarithmically digitize the electrically converted backscatter pulse 101 and return pulse 68, respectively. The conversion to a logarithmic scale simplifies processing.

Figure 5:
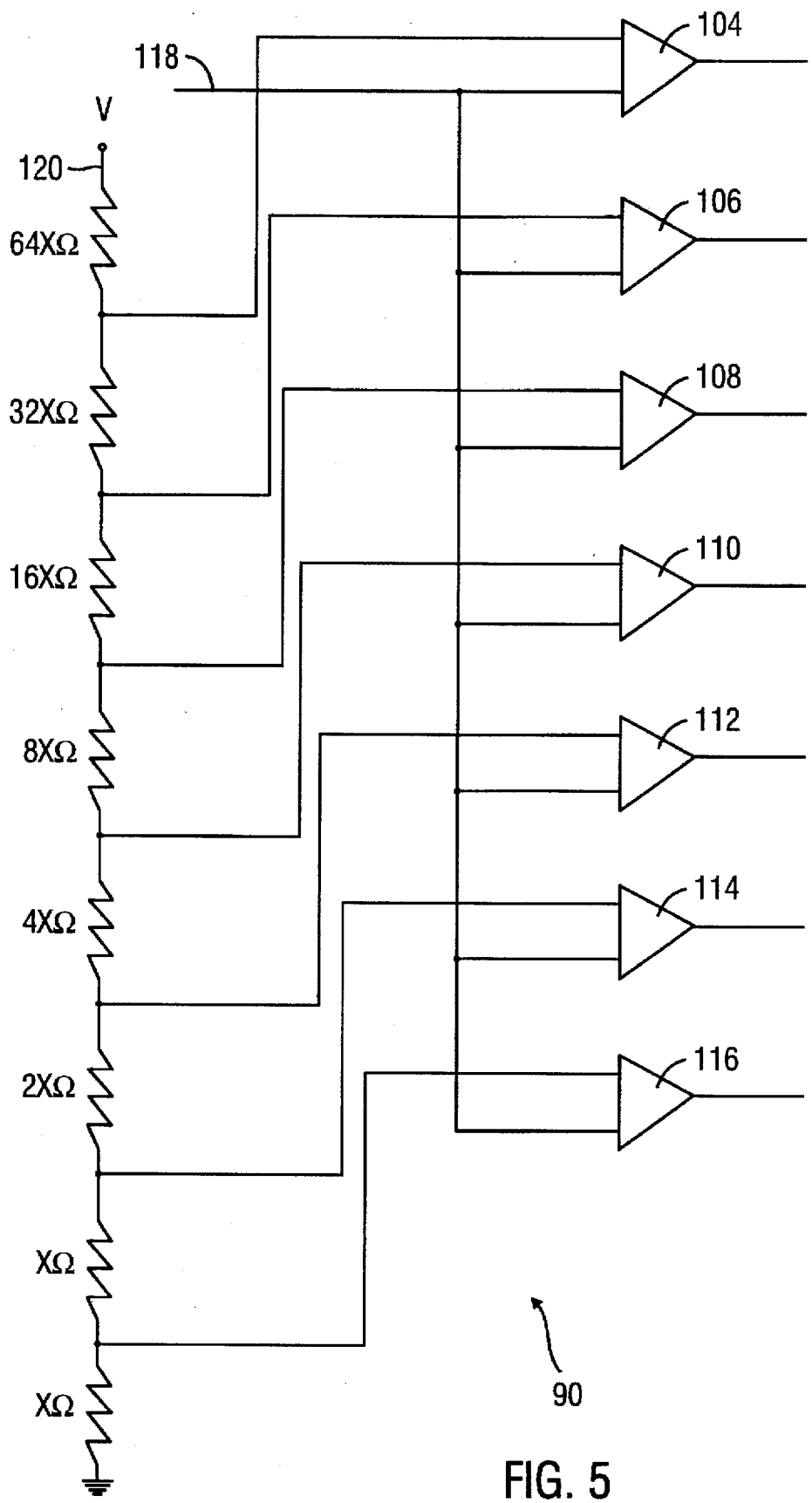
FIG. 5 illustrates a schematic diagram of an exemplary non-linear comparator circuit.

One example of the nonlinear comparator circuits 90a and 90b is illustrated in FIG. 5. The seven comparators 104, 106, 108, 110, 112, 114, and 116 each receive the input signal from the amplifier 100 on line 118. Each comparator 104–116 is coupled to a particular node on a resistor bridge 120. A voltage V is applied to the top of the resistor bridge 120. The values of the resistors in the resistor bridge 120 are selected so that the comparators 104–116 operate in logarithmic fashion. In other words, the threshold voltage for the comparator 116 is V/128 volts, the threshold voltage for the comparator 114 is V/64 volts, the threshold voltage for the comparator 112 is V/32 volts, the threshold voltage for the comparator 110 is V/16 volts, the threshold voltage for the comparator 108 is V/8 volts, the threshold voltage for the comparator 106 is V/4 volts, and the threshold voltage for the comparator 104 is V/2 volts.

The operation of the nonlinear comparator circuits 90a and 90b is quite simple. If the input voltage on line 118 is less than V/128 volts, each comparator 104–116 delivers a binary zero. Once the input voltage on line 118 rises slightly above V/128 volts, the comparator 116 outputs a binary one, while all other comparators 104–114 output binary zeros. As the input voltage on line 118 rises above each comparator's threshold voltage, that comparator delivers a binary one. Therefore, if the input voltage on line 118 rises above V/2 volts, all comparators 104–116 will output a binary one.

Figure 6:
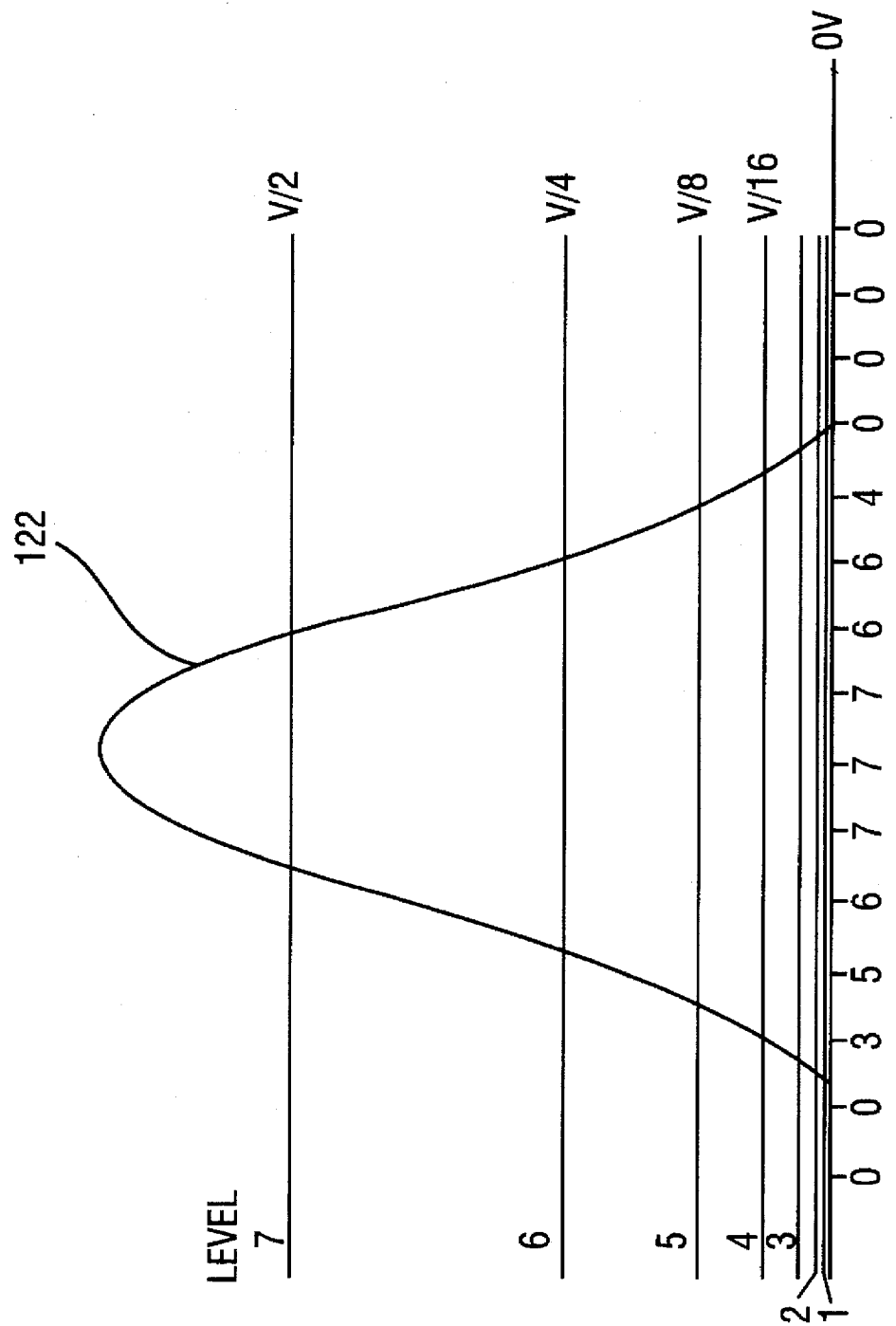
FIG. 6 illustrates an exemplary pulse signal being operated upon by the comparator circuit of FIG. 5.

A graphical representation of this function may be found in FIG. 6, which plots the amplitude of an electrical input pulse 122 (which may represent the pulse delivered by either optical-to-electrical converter 97 or 86) versus time. As can be seen, the amplitude of the input pulse 122 begins at zero, rises above V/2 volts, and then falls back to zero. The numerals listed along the time axis depict the number of comparators 104–116 that output a binary one at a particular sampling time.

The encode and time multiplexing circuit 92, the RAM 94, the convolution circuit 96, and the peak detector 98 mentioned above form a channel and are part of the ASIC 99 illustrated in FIG. 4. As previously mentioned, the ASIC 99 in this embodiment has three such channels. However, for the purposes of this discussion, FIG. 4 illustrates only the two channels that are coupled to receive the backscatter pulse 101 and the return pulse 68. In the interest of clarity, only one channel will be described with the understanding that the other channels operate similarly.

The encode and time multiplexing circuit 92 samples the status or state of the comparator circuit 90 every nanosecond to determine how many comparators 104–116 are turned on, i.e., delivering a binary one. Advantageously, the encode and time multiplexing circuit 92 digitizes the received signal at a 1 GHz rate to yield a ranging resolution of 15 cm. By using the digital analysis techniques described above, a more robust determination of range can be obtained under dynamic conditions than would be the case with simpler analog methods used by some laser range finders.

The encode and time multiplexing circuit 92 has three functions: (1) to sample the input waveform at 1 GHz, (2) to encode the sampled code from the comparators 104–116 into a three-bit word logrithmically proportional to the peak of the input signal, and (3) to time demultiplex the signal to 250 MHz compatible with the RAM 94. For this last function, the circuit 92 includes a four-to-one time demultiplexer that allows 4 nanoseconds for the encoding of a signal. The encode and time multiplexing circuit 92 converts the seven bit input into three-bit samples that are stored in the RAM 94. This technique simplifies the PCE 14 and thus reduces the component cost. The RAM 94 stores the one nanosecond samples during the range-gated receive. Dead time between transmitted pulses is used to read and analyze the stored samples at a 50 MHz rate to simplify processing.

After the incoming data stream is digitized and stored, as described above, the detailed analysis that utilizes many time samples is performed. This analysis essentially slides a template across the stored sequence of samples to find the best match. The location of this best match corresponds to the arrival time of the return pulse 68, while the strength of the match is related to its intensity. The template averages or convolves many samples together to improve the signal-to-noise ratio and to find the center of the return pulse. A matched-filter convolution circuit 96 extracts the range and intensity information from the data stream that contains the return pulse 68. This process produces accurate data under low signal-to-noise conditions and with widely varying reflectivity returns, and it can isolate secondary returns from interference such as from under trees or behind camouflage nets. The PCE 14 delivers signals indicative of range, intensity, and pulse profile to the signal processing unit 18.

The PCE 14 also includes a firing circuit (not shown) that delivers a signal to the laser unit 26. The firing circuit delivers a fire signal at a user selectable rate, typically 6 to 10 kHz. The fire signal initiates the generation of the transmitted laser beam pulse 34. As can be seen by referring to the graph illustrated in FIG. 7, the fire signal occurs at time $t_f$. However, the laser beam pulse 34, represented by the backscatter signal 140 (the electrical equivalent of the backscatter pulse 101 delivered by the backscatter detector 89), is not delivered at time $t_f$ because it takes a finite amount of time, given the physics of the laser unit 26, to generate the laser beam pulse 34. Therefore, the laser beam pulse 34 does not fire until $t_{p1}$ which is some time $\Delta t$ after the arrival of the initial fire signal at time $t_f$. At time $t_{p1}$, the laser beam pulse 34, and thus the backscatter signal 140, reaches its peak amplitude and begins to diminish.

The backscatter signal 140 delivered by the backscatter detector 89 is used for two purposes. First, it denotes the time $t_{p1}$, which is the actual firing time, so that the signal processing unit 18 can determine the time-of-flight by subtracting $t_{p1}$ from $t_{p2}$. Second, the PCE 14 encodes the backscatter signal 140, determines its intensity, and delivers a signal correlative to its intensity to the signal processing unit 18. The signal processing unit 18 uses this information, along with similar information from other backscatter pulses to correct for differences in magnitude between the transmitted laser beam pulses 34. This can best be understood by referring to the following defined variables and the following mathematical equations that define the steps performed by the signal processing unit 18 as described with reference to FIGS. 8, 9A, and 9B:

K—scan variable equal to between I and L, where L is the number of scans to average I—row variable equal to between I and N, where N is the number of rows in the scan J—column variable equal to between I and M, where M is the number of columns in the scan $B_{I,J}$—backscatter intensity for pixel I,J (proportional to outgoing peak power)

$S_{I,J}$—signal intensity for pixel I,J (proportional to received peak power)

$C_{I,J}$—intensity correction factor for pixel I,J $S_{I,J}$—corrected signal intensity for pixel 12

$SDC_{I,J}$—scanner dependent correction factor for pixel I,J $SUM_{I,J}$—the sum of L backscatter intensities $B_{I,J}$ $$B_{AVG} = \frac{\sum_{I=1 \text{ to } N, J=1 \text{ to } M} B_{IJ}}{N * M}$$

or $$B_{AVG} = B_{MEDIAN}$$

-continued $$C_{IJ} = \frac{B_{IJ}}{B_{AVG}} \text{ for } I = 1 \text{ to } N \text{ and } J = 1 \text{ to } M$$

$$S_{IJ}' = \frac{S_{IJ}}{C_{IJ}} \text{ for } I = 1 \text{ to } N \text{ and } J = 1 \text{ to } M$$

Figure 8:
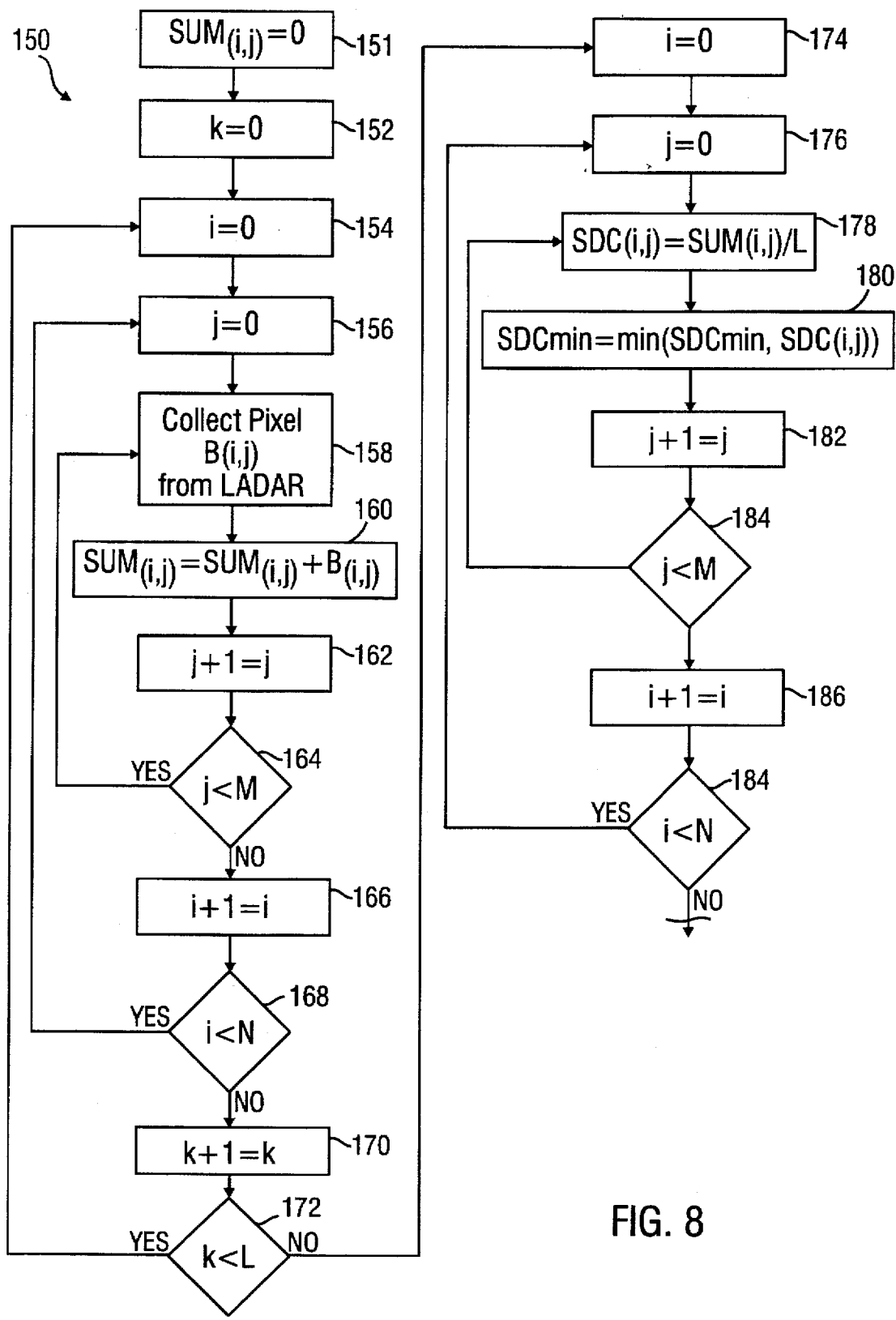
FIG. 8 illustrates a flowchart depicting the determination of a scanner dependent correction factor.
Figure 9A:
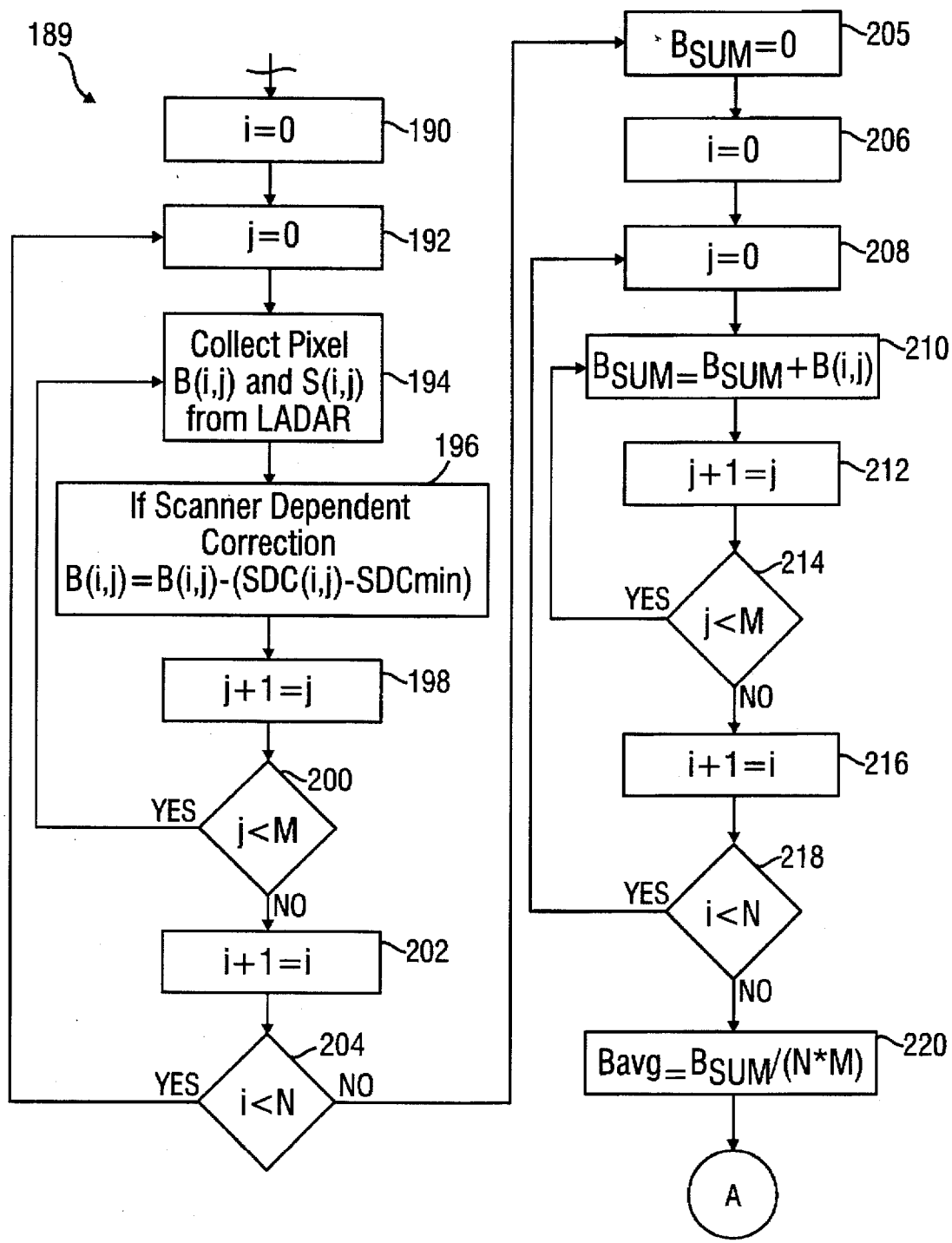
FIGS. 9A and 9B illustrate a flowchart depicting the formation of a corrected intensity image.
Figure 9B:
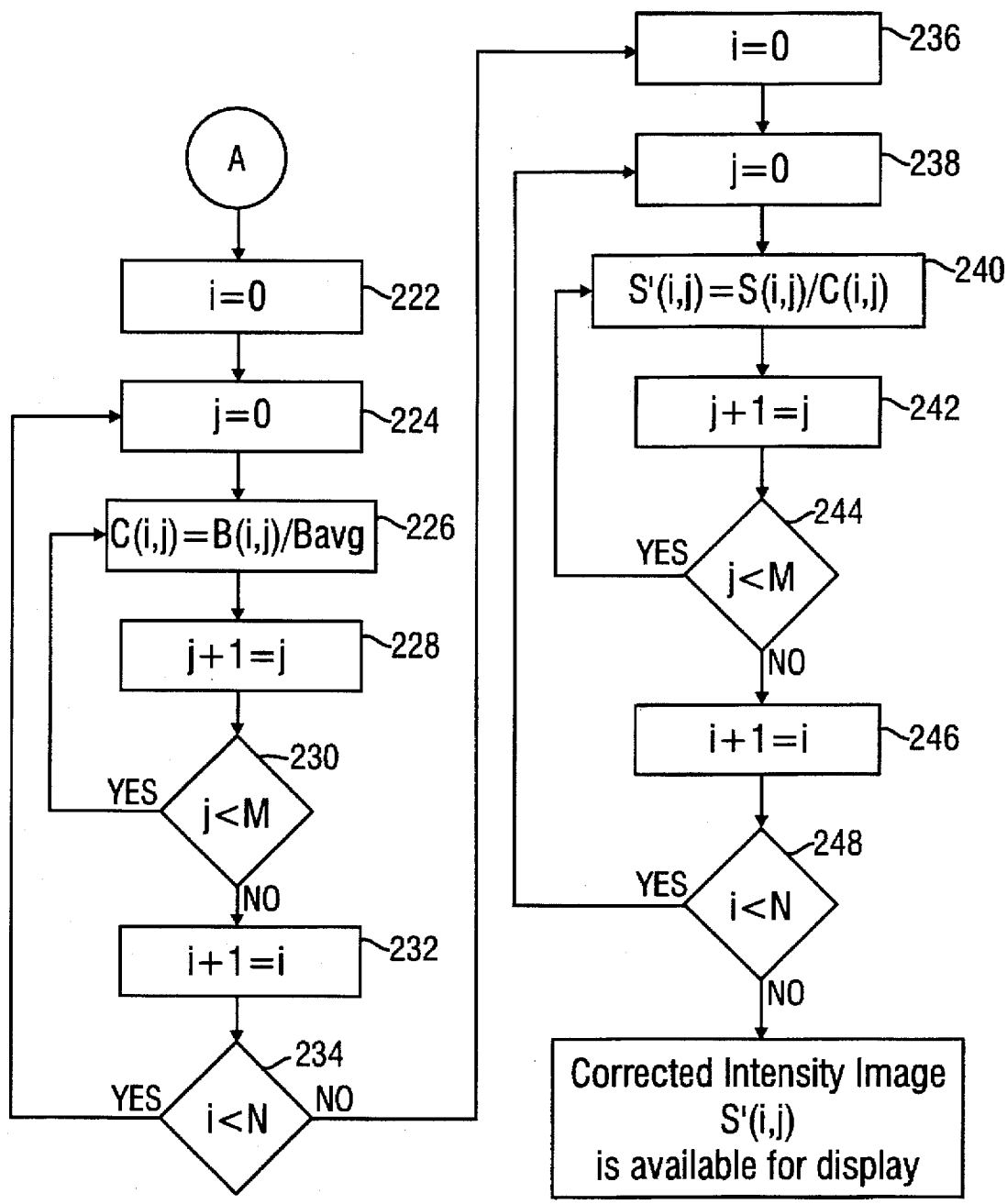

FIGS. 8, 9A, and 9B illustrate flowcharts 150 and 189 that describe the manner in which the signal processing unit 18 processes the intensity signals to form a sharper intensity image. To form a sharper and more accurate intensity image, the signal processing unit 18 performs two basic functions. First, the signal processing unit 18 corrects for scanner-induced anomalies. Second, the signal processing unit 18 corrects for intensity variations caused by differences in magnitude of the many transmitted laser beam pulses 34 that produce the return pulses 68 used to create an entire image.

Figure 10:
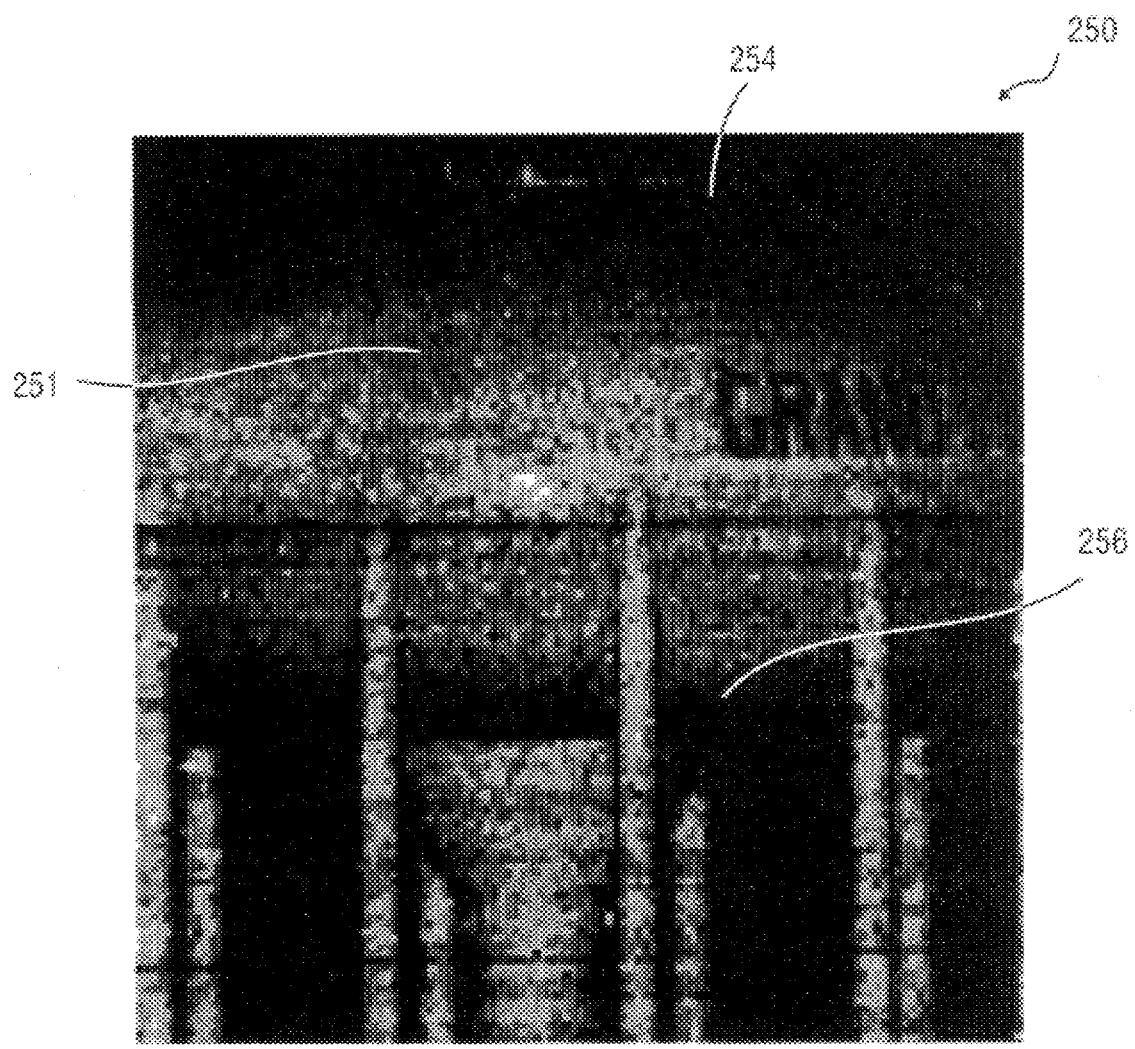
FIG. 10 illustrates an exemplary intensity image of a water tower produced by a LADAR system without an intensity correction factor.

Scanner-induced anomalies are produced if an intensity correction is made without accounting for scanner dependent backscatter intensity fluctuations. These anomalies may appear at different locations in an image, and they may introduce varying degrees of inaccuracy into the intensity image. One example of a scanner-induced anomaly 251 is illustrated in a corrected intensity image 260 illustrated in FIG. 11. As can be seen in FIG. 10, the anomaly does not appear in the uncorrected intensity image 250.

While the following technique may be performed at the time every intensity image is formed, it is advantageous to form a single scanner dependent correction array that can later be applied when forming intensity images. To form a scanner dependent correction array, the manufacturer or user, for instance, advantageously aims the LADAR system 10 at a fixed target field, such as the sky or a single color object like a painted wall. Then, a number of laser beam pulses 34 are transmitted into the fixed target field to form a number L of arrays that are averaged to form a scanner dependent correction array SDC.

The flowchart 150 describes a method for correcting for scanner-induced anomalies. In block 151, the variable array SUM$_{I,J}$, which represents the array sum of L backscatter intensity arrays, is set to zero. In blocks 152, 154, and 156, the variables K, I, and J are set to zero. In block 158, the backscatter intensity signal B for the pixel in row I, column J, is sampled by the signal processing unit 18. The backscatter intensity signal B for the pixel in row I, column J, is added to the sum of the backscatter intensities for the pixel in row I, column J. In block 162, the column J is incremented by 1, and, in block 164, the column J is compared to the number M of columns in the scan. Until each column J has been read from a particular row I, control transfers back to block 158, and the steps described in blocks 158, 160, 162, and 164 are repeated.

Once the backscatter intensity signal B for each pixel of each column J of a particular row I has been processed, the row I is incremented by 1, as set forth in block 166. In block 168, the row I is compared to the number N of rows in the scan. Until each row I has been scanned, control transfers back to block 156 where the column J is reset to zero, so that the steps described in blocks 158, 160, 162, 164, 166, and 168 may be repeated.

Since a single backscatter intensity array is contaminated by both time-invariant scanner effects and time-variant laser power fluctuations, this process is repeated a number of times L to average out the time-variant laser power fluctuations. Therefore, once each row I and each column J has been scanned, the scan variable K is incremented in block 170. In block 172, the scan variable K is compared to the number of scans L to be averaged. Until the scan variable K equals the number of scans L to be averaged, control transfers back to block 154, and the steps of blocks 154–172 are repeated. Because different LADAR systems have different lasers and optical systems, the number of scans L is best determined by testing each type of LADAR system.

Once the number of scans L has been added in array fashion, the row I and the column J are reset to zero in blocks 174 and 176, respectively. In block 178, the average scanner dependent correction array SDC is determined by dividing the array sum of L backscatter intensity arrays by the number of scans L. In block i 80, the minimum scanner dependent correction SDC$_{min}$ is determined by selecting the smallest scanner dependent correction factor from previous SDC$_{min}$ signals and the SDC just defined in block 178. Next, in block 182, the column J is incremented by 1, and, in block 184, the column J is compared to the number of columns M in the scan. Until the column J equals the number of columns M in the scan, the steps set forth in blocks 178–184 are repeated. Once each column J of a particular row I has been scanned, the row I is incremented by I in block 186, and, in block 188, it is compared to the number of rows N in the scan. Until each column J of each row I in the scan has been processed, the steps of blocks 176–188 are repeated.

Upon completion of this process, the values of SDC$_{I,J}$ and SDC$_{MIN}$ are stored for later use by the intensity correction method described with reference to FIGS. 9a and 9b. The flowchart 189, depicted in FIGS. 9a and 9b, describes a method for correcting the intensity of pixels used to generate an intensity image. This correction is performed due to the fluctuation in the magnitudes of the transmitted laser beam pulses 34 used to illuminate the target field. Such fluctuation is represented in FIG. 7 by the two pulses 140a and 140b. As can be appreciated, an object reflects a transmitted laser beam pulse 34 having a given magnitude to produce a return pulse 68 having some given magnitude. Thus, an object that reflects a transmitted laser beam pulse 34, which corresponds to the pulse 140a, may deliver a return pulse 69a. The same object may reflect a laser beam pulse 34 having a lower magnitude, which corresponds to the pulse 140b, and deliver a return pulse 69b having a relatively lower magnitude.

Referring to the flowchart 189, in blocks 190 and 192, the row I and the column J are set to zero. In block 194, the backscatter intensity signal B and the return intensity signal S for each pixel in row I, column J, is sampled by the signal processing unit 18. The backscatter intensity signal B is corrected for scanner-dependent anomalies, as shown in the block 196. Then, in block 198, the column J is incremented by 1, and, in block 200, the column J is compared to the number of columns M in the scan. Until each column J of a particular row I is processed, the steps 194–200 are repeated.

Once the pixels in each column J of a row I are processed according to the steps set forth in blocks 194–200, the row 1 is incremented by i in block 202. In block 204, the row I is compared to the number of rows N in the scan. Until each pixel in each column J in each row I in the scan is processed, the steps 192–204 are repeated.

Once the backscatter intensity signal B for each pixel of each row I and column J in the scan has been corrected to reduce or eliminate scanner-dependent anomalies, the backscatter sum variable B$_{SUM}$, the row variable I, and the column variable J are reset to zero in blocks 205, 206 and 208, respectively. In blocks 230, 212, 214, 216, and 218, the value of each backscatter intensity signal B For each pixel in each row I and column J in the scan is summed together. Then, in block 220, the average backscatter intensity signal B$_{AVG}$ for the scan is determined by dividing B$_{SUM}$ by the total number or pixels in the scan. Alternatively, the average backscatter intensity signal $B_{AVG}$ for the scan may be set to the median value of all backscatter intensity signals.

Once the average backscatter intensity signal $B_{AVG}$ is determined, the row I and column J are reset to zero in blocks 222 and 224, respectively. In block 226, the intensity correction factor $C_{I,J}$ for each backscatter intensity signal $B_{I,J}$ is calculated as shown in blocks 226–234. Basically, the intensity correction factor $C_{I,J}$ is calculated by dividing the backscatter intensity signal $B_{I,J}$ for each pixel by the average backscatter intensity signal $B_{AVG}$.

Once the intensity correction factor $C_{I,J}$ for each backscatter intensity signal $B_{I,J}$ is determined, the row I and column J are set to zero in blocks 236 and 238, respectively. Then, the corrected signal intensity signal $S'_{I,J}$ for each pixel for each row I and column J is calculated in blocks 238–248. Essentially, the received signal intensity signal $S_{I,J}$ is divided by the intensity correction factor $C_{I,J}$ for each pixel. Once the corrected signal intensity signal $S'_{I,J}$ is calculated for each pixel, the corrected intensity image may be displayed.

Figure 11:
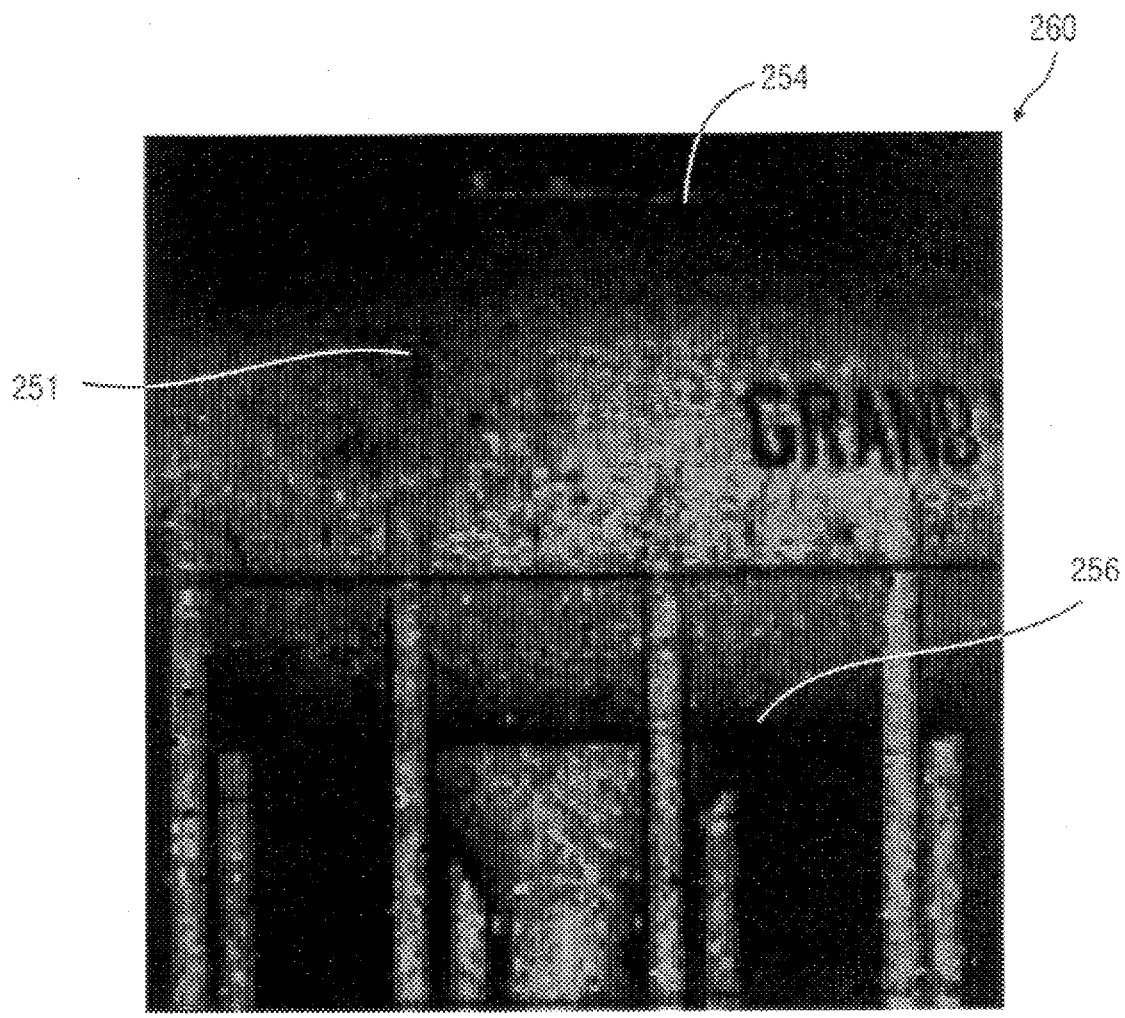
FIG. 11 illustrates an exemplary intensity image generated by a LADAR system with an intensity correction factor.

FIGS. 10 and 11 are provided so that the difference between a normal intensity image and a corrected intensity image can be viewed. The normal intensity image 250. illustrated in FIG. 10, is an image of a water tank 252. The curved upper portion 254 of the water tank 252 and the curved lower portion 256 of the water tank 252 are not nearly as well defined as those same areas of the water tank 252 illustrated in the corrected intensity image 260 of FIG. 11. An automatic target recognition system would have a relatively difficult time identifying an edge of the water tank 252 in the normal intensity image 250. However, an automatic target recognition system would have a much easier time finding an edge of the water tank 252 in the corrected intensity image 260.

It should be noted that a scanner-induced anomaly 251 appears in the intensity image 260. This anomaly 251 was created by performing the intensity correction without the scanner dependent correction described above. The scanner dependent correction reduces or eliminates the anomaly 251.

What is claimed is:

1. A method of generating target information, said method comprising the steps of:

(a) generating successive laser pulses, each of said successive laser pulses having a respective magnitude;

(b) scanning each of said successive laser pulses in a target field;

(c) receiving reflections from said successive laser pulses;

(d) determining said respective magnitude of each of said successive laser pulses;

(e) generating a correction factor correlative to varying magnitudes of said successive laser pulses;

(f) applying said correction factor to said received reflections to generate corrected reflection signals; and (g) generating an intensity image using said corrected reflection signals.

2. The method, as set forth in claim 1, wherein step (a) comprises the step of:

generating said successive laser pulses having a wavelength greater than 1.4 microns.

3. The method, as set forth in claim 1, wherein step (d) comprises the step of:

sensing light scattered from said successive laser pulses, said scattered light having a magnitude correlative to the magnitude of said respective successive laser pulses.

4. The method, as set forth in claim 1, wherein step (e) comprises the step of:

determining an average magnitude of said successive laser pulses.

5. The method, as set forth in claim 1, wherein step (e) comprises the step of:

determining a median magnitude of said successive laser pulses.

6. An apparatus for generating target information, said apparatus comprising:

means for generating successive laser pulses, each of said successive laser pulses having a respective magnitude;

means for scanning each of said successive laser pulses in a target field;

means for receiving reflections from said successive laser pulses;

means for determining said respective magnitude of each of said successive laser pulses;

means for generating a correction factor correlative to varying magnitudes of said successive laser pulses;

means for applying said correction factor to said received reflections to generated corrected reflection signals; and means for generating an intensity image using said corrected reflection signals.

7. The apparatus, as set forth in claim 6, wherein the means for generating successive laser pulses comprises:

means for generating said successive laser pulses having a wavelength greater than 1.4 microns.

8. The apparatus, as set forth in claim 6, wherein the means for determining comprises:

means for sensing light scattered from said successive laser pulses, said scattered light having a magnitude correlative to the magnitude of said respective successive laser pulses.

9. The apparatus, as set forth in claim 6, wherein means for generating a correction factor comprises:

means for determining an average magnitude of said successive laser pulses.

10. The apparatus, as set forth in claim 6, wherein means for generating a correction factor comprises:

means for determining a median magnitude of said successive laser pulses.

11. An apparatus for generating target information, comprising:

a transmitter being adapted to deliver a laser pulse having a magnitude into a target field;

a receiver being adapted to receive a reflection of said laser pulse from an object in said target field and to deliver a reflection signal correlative to said received reflection;

a detector being arranged to receive light from said laser pulse, said detector delivering a detector signal having a magnitude correlative to said magnitude of said laser pulse; and a processor being coupled to said receiver to receive said reflection signal and said detector signal, said processor processing said detector signal and said reflection signal to generate a corrected intensity signal correlative to reflectivity of said object.

12. A LADAR system, comprising:

an optical transmitter and receiver being adapted to scan successive laser pulses, each laser pulse having a magnitude, through a target field and to receive reflections of said successive laser pulses from an object in said target field;

a detector being arranged to receive light from said successive laser pulses, said detector delivering successive detector signals, each detector signal having a magnitude correlative to said magnitude of each of said respective successive laser pulses;

a pulse capture device coupled to said optical transmitter and receiver and to said detector, said pulse capture device having an optical-to-electrical converter that converts said reflections to correlative electrical signals and that converts said detector signals to correlative electrical signals; and a signal processing unit that receives said electrical signals to generate an image containing information correlative to reflectivity of said object.

* * * * *